Patented Nov. 8, 1932

1,886,915

UNITED STATES PATENT OFFICE

ERNST STELZER, OF ESSEN-RUHR, GERMANY, ASSIGNOR TO THE FIRM TH. GOLDSCHMIDT A.-G., OF ESSEN-RUHR, GERMANY

PROCESS FOR THE PRODUCTION OF COLLOIDAL WHITE LEAD—BASIC LEAD CARBONATE—FROM LEAD OXIDE

No Drawing. Application filed September 13, 1928, Serial No. 305,876, and in Germany September 15, 1927.

This invention relates to a process for the production of colloidal white lead (basic lead carbonate) from lead oxide.

The conversion of lead oxide (lead hydroxide) into white lead may be effected by means of carbon dioxide in the presence of water. However as is well known in the art, this conversion proceeds very sluggishly and a long time is required to complete the course of the reaction.

In order to accelerate this reaction, it has already been proposed to add other substances, particularly acetic acid and salts of acetic acid adapted to dissolve the difficultly soluble lead oxide as a basic acetate in order to precipitate out basic lead carbonate from the solution by the subsequent introduction of carbon dioxide. It has also been proposed to convert lead salts such as the chloride and sulphate into the carbonate by treatment with ammonia and carbon dioxide. Such processes convert large quantities of ammonia into the chloride or sulphate and the lead carbonate produced usually contains some sulphate or chloride.

The process of the present invention is distinguished from the aforesaid known processes in which the lead carbonate is obtained by precipitation reactions, by the feature that basic lead carbonate is obtained by a topochemical transformation of lead oxide in the form of an aqueous slime by means of carbon dioxide. By a topochemical reaction I mean a reaction in which one solid is transformed into another without essential change of volume, in contrast to the usual precipitation reaction where the individual particles of the original material become dissolved and are then precipitated; the volume occupied by the precipitate differing appreciably from that of the original solid. By compressing the reaction into a locally limited spot (instead of a whole zone) as occurs in a topochemical reaction, the conversion product is obtained in great dispersity. The expression was first used by Kohlschütter, Z. anorg. allgem. Chem., 105, 1 (1919). In carrying out the process neutral or weakly alkaline compounds are added which have no solvent action or only a very slight solvent action on lead carbonate, and which accelerate the purely topochemical conversion of the lead oxide into lead white. For example when ammonia is added to lead oxide in the form of an aqueous slime and carbon dioxide is introduced, the lead oxide is transformed into basic lead carbonate and swells to a large degree. The topochemical conversion proceeds with great ease and rapidity and furnishes a good yield. A white lead is produced which is characterized by an extraordinarily high degree of dispersion.

In a practical embodiment of the present invention 100 parts by weight of commercial lead oxide are suspended in 600 parts by weight of water containing 1.7 parts of $NH_3$. The products of combustion or chimney gases containing, say, 10 per cent $CO_2$, are led through the mixture under vigorous agitation. The reaction goes ahead vigorously with nearly complete absorption of the $CO_2$. Introduction of flue gases is interrupted when the $CO_2$ content of the white lead reaches about 11.5 per cent. The product, after washing and drying, has a high grade of dispersion and an open smooth character.

The lead oxide used may be commercial litharge or special hydrated preparations made by oxidizing lead chemically or electrically. The production of the lead oxid and the use of the present process may be simultaneous.

What I claim is:—

1. A process of converting lead oxid directly into colloidally dispersed white lead in a topochemical reaction which comprises suspending the lead oxid in water containing a small concentration of ammonia and passing $CO_2$ gas into said suspension.

2. The process of making colloidally dispersed white lead which comprises suspending lead oxid in water in the presence of ammonia, the concentration of $NH_3$ being less than 1 per cent of that of the water, and leading clean flue gases into the suspension, thereby converting the lead oxid directly into basic carbonate.

In testimony whereof I affix my signature.

E. STELZER.